United States Patent
Hopton et al.

[15] 3,706,679
[45] Dec. 19, 1972

[54] VINYL RESIN BLOWABLE INTO A RIGID SMOOTH SKIN MICROCELLULAR PROFILE

[72] Inventors: Thomas E. Hopton, Stow; Robert P. Socha, Lakewood, both of Ohio

[73] Assignee: The Goodyear Tire & Rubber Company, Akron, Ohio

[22] Filed: Aug. 6, 1970

[21] Appl. No.: 61,816

[52] U.S. Cl. ...... 260/2.5 E, 260/2.5 HB, 260/23 XA, 260/28.5 D, 260/45.75 K, 260/45.8 N, 260/890, 260/898, 260/899, 260/901, 264/54
[51] Int. Cl. ...... C08f 47/10, C08f 45/62, C08f 29/18
[58] Field of Search ........ 260/2.5 P, 2.5 E, 45.8 N, 23 XA, 260/45.75 K

[56] References Cited

UNITED STATES PATENTS

| | | | |
|---|---|---|---|
| 3,197,423 | 7/1965 | Ackerman | 260/2.5 P |

FOREIGN PATENTS OR APPLICATIONS

| | | | |
|---|---|---|---|
| 1,052,289 | 12/1966 | Great Britain | 260/2.5 E |
| 615,283 | 2/1961 | Canada | 260/2.5 P |

*Primary Examiner*—Murray Tillman
*Assistant Examiner*—Wilbert J. Briggs, Sr.
*Attorney*—F. W. Brunner and V. G. Parker

[57] ABSTRACT

A composition for and method of making a rigid impact resistant microcellular, whittlable and nailable woodlike structure having a smooth and integral skin.

9 Claims, No Drawings

VINYL RESIN BLOWABLE INTO A RIGID SMOOTH SKIN MICROCELLULAR PROFILE

This invention relates to a dry blend thermoplastic vinyl resin composition extrudable into a rigid impact resistant microcellular, whittlable and nailable woodlike structure having a smooth integral skin and to the process for converting the dry blend into the woodlike structure.

The successful extrusion of these rigid structures or profiles requires a balance of many factors both with respect to the formulation of the composition and to the conditions under which the composition is extruded continuously into the desired profile. The formulation comprises the resin being extruded into a blown and rigid profile, a blowing agent, an activator system for the blowing agent, and other conventional components such as processing aids, impact modifiers, and internal and external lubricants. After the formulation is selected to produce the desired product, conventional adjustments are then made in a conventional extruder such as speed of extrusion and temperature conditions in the various zones of the extruder with special care being taken with regard to the temperature of the surface of the die where the extruded material leaves the extruder die.

It has now been discovered that, in a conventional formulation useful in the production of extruded rigid profiles using a medium molecular weight vinyl chloride polymer having an inherent viscosity between about .66 and about 1.12 measured according to ASTM test method D1243 and using the formula $$MW = 313 \times 10^2 [\log_{10}^{-1[I.V.]} 2.0 - 1]$$

where MW is molecular weight, [I.V.] is intrinsic viscosity, and a blowing agent such as those commonly used in forming microcellular voids including the amides such as azodicarbonamide, improved properties in the profile are produced when the new and improved activator system of this invention is used in combination with the chemical blowing agent.

The following formulation defined in broad terms and by example may be used in producing microcellular rigid thermoplastic resinous profiles.

| General and specific example | Amount preferred | Range (G) - General (P) - Preferred | |
|---|---|---|---|
| 1. Thermoplastic vinyl resin | 100 | 100 | |
|  a. (vinyl chloride polymer having inherent viscosity of .66 to 1.12) | | | |
| 2. Chemical blowing agent | .5 | (G) | .1 to 3.5 |
|  | | (P) | .3 to 1 |
|  a. azoamides (azodicarbonamide) | | | |
| 3. Activator system comprising components | | | |
|  A. (primary activator) | 1.5 | (G) | 1.0 to 3.0 |
|  | | (P) | 1.2 to 2.0 |
|   a. organo-tin thioglycolate [di n-butyl tin bis(isooctyl-mercaptoacetate)] | | | |
|  B. (secondary activator) | 1.0 | (G) | .5 to 1.5 |
|  | | (P) | .8 to 1.2 |
|   a. barium salts of saturated fatty acids of $C_{14}$ to $C_{18}$ (barium stearate, barium palmitate) $C_{18}$ $C_{16}$ | | | |
| 4. Processing aid | 3.0 | (G) | 0 to 5.0 |
|  | | (P) | 2.0 to 4.0 |
|  A. Acrylate polymer | | | |
|   a. polymethylmethacrylate | | | |
| 5. Internal lubricants | 1.5 | (G) | 0 to 5.0 |
|  | | (P) | 2.0 to 4.0 |
|  a. epoxidized soya oil | | | |
|  b. tris nonyl phenyl phosphite | | | |
| 6. External lubricants | .5 | (G) | 0 to 3.0 |
|  | | (P) | .1 to 1.0 |
|  a. paraffin wax | | | |
|  b. Montan wax | | | |
|  c. calcium stearate | | | |
|  d. stearic acid | | | |
|  e. Montan wax partially saponified with calcium | | | |
|  f. modified straight hydrocarbon wax | | | |
|  g. mineral oil | | | |
| 7. Impact modifier | 10.0 | (G) | 0 to 15.0 |
|  | | (P) | 5 to 12.0 |
|  a. acrylonitrile/butadiene/styrene resin polymer | | | |

More specifically the following formulation was used in making the improved blown rigid profile of this invention. All parts are by weight throughout the disclosure unless otherwise indicated.

| Specific Formulation | Parts by Weight |
|---|---|
| 1. Polyvinyl chloride (I.V. .82–.90) | 100.0 |
| 2. Azodicarbonamide powder | .5 |
| 3. Barium stearate/barium palmitate (65/35) | 1.0 |
| 4. (di n-butyl tin bis(isooctylmercaptoacetate) | 1.5 |
| 5. Graft acrylonitrile/butadiene/styrene resin* | 10.0 |
| 6. Methacrylate polymer | 3.0 |
| 7. Epoxidized soya oil | 1.5 |
| 8. Tris-nonyl phenyl phosphite | .75 |
| 9. Paraffin wax | .5 |
| 10. Montan wax | 1.0 |

*tensile strength 2400 lbs. per sq. inch and specific gravity 0.99.

Each of these components was dry blended in a conventional high intensity mixer used in a conventional way by adding the components in the following order: first the dry ingredients, (1), (2), (5), (6); second the wet ingredients, (4), (7), (8); and third the waxy ingredients, (3), (9), (10). The resulting powder blend was cooled and fed to a Davis-standard extruder having the following specifications:

Extruder size: 2½ inches diameter
Tee Die: 2.03 cm² cross section with land/thickness = 4/1
Screens: (1) 20 mesh (1) 40 mesh
Screw: 2:1 compression ratio 24/1 length-diameter ratio
Drive Motor: 40 HP The extruder was operated under the following conditions:

| Barrel Temps. °F. | Zone 1 | 350 |
|---|---|---|
|  | Zone 2 | 350 |
|  | Zone 3 | 350 |
|  | Zone 4 | 350 |
| Die Temp. °F. | | 320 |
| Screw Speed, RPM | | 20 |
| Motor Load, Amps | | 38 |
| Rate, lb/hour | | 60–59 |
| Stock Temp. °F. by Radiometer | | 375 |
| Gate pressure, psi | | 2500 |

Characteristics of Extruded Profile

1. Specific gravity, or density in g/cc = 1.119 (ASTM D–792)
2. Cross section area cm² = 2.35
   Cross-section area was obtained by measuring extruded profile specimens for weight in grams and dividing by the length in cm, multiplied by density in g/cm³.
3. Swell percent 15.7

The percent swell was a measure of the difference in cross-section area between the extruded stock and the die opening. The formula is:

Percent Swell = (Area Stock—Area Die Opening/Area Die Opening)

4. Surface condition
   The skin is smooth to the touch and has an average thickness of about 18 to 27 microns.
5. Foam condition
   A fine microcellular closed spherical cell structure with an average cell size of about 50 to 80 microns.
6. Nailability
   Ordinary nails were hammered into the structure without cracking or crazing the structure and were retained securely against normal withdrawal forces.
7. Knife shaving
   The structure was easily whittled in the same manner as soft pine is whittled.
8. Impact resistance
   The profile did not shatter when bent in a vise at a 90° angle.
9. Flammability rating
   Profile rated as non-burning by ASTM D-635 test procedure.

Chemical blowing agents that release nitrogen may be used in forming a microcellular structure in the vinyl resins used in making the blowable compositions used in making the profiles in this invention. The preferred chemical blowing agents are the amides and more specifically azodicarbonamide. Well known blowing agents include:

N,N'-dinitroso-N,N'-dimethyl terephthalamide
N-aminophthalimide
4,4'-oxybis (benzenesulphonylhydrazide)
N,N'-dinitrosopentamethylenetetramine
Azoisobutyric dinitrile
Diazoaminobenzene
Dinitropentamethylene tetramine
Benzenesulfohydrazide
Terephthalyl bis (N-nitrosomethylamide)
Toluene-2,4-bis (sulfonyl hydrazide)
p-tertiary butylbenzazide
p-carbomethoxy benzazide
Diarylpentaazidiene
3 methyl,1,5-diphenylpentaazidiene The blowing agent is used in an amount sufficient to produce the degree of blow desired and generally is used in an amount of about .1 to about 3.5 parts by weight per 100 parts of resin being blown.

The dry blend blowable vinyl resin composition of this invention may be continuously extruded into a profile having such desirable properties as microcellular structure, woodlike whittlability and nailability, rigidity, and a smooth integral skin when the activator system of this invention is employed. The activator system functions to control the temperature at which the vinyl resin fuses to provide the proper environment into which the blowing agent releases gaseous nitrogen. Unless the activator system of this invention is used in combination with a blowing agent as shown in the formulations above, improper blow occurs throughout the structure, the profile is uneven and either is not encased in a skin or the skin becomes uneven and rough due to the presence of blow holes. These problems are especially severe and present when the vinyl resin being blown is unplasticized.

The activator system of the present invention comprises a combination of an organo-tin thioglycolate ester and the barium salt of a fatty acid having a carbon content of between C14 and C18. The barium salt may also be made from hydrogenated unsaturated fatty acids wherein the barium content averages from about 18 percent to 23 percent based on the total molecular weight of the salt. Therefore, a C14 acid salt would contain about 18.8 percent barium and a C18 acid salt would contain about 22.2 percent barium. The barium salts may be used in a mixture, e.g. from 50/50 to 90/10 and preferably 65/35 to 80/20 mixture of barium stearate/barium palmitate. The specific thioglycolate which produces the results achieved in the present invention is di n-butyl tin bis (isooctylmercaptoacetate). Mixtures of the di butyl- and the mono butyl- may also be used where the di butyl- is present in the major proportion up to 96 percent, whereas the mono butyl- is present in minor amounts down to about 4 percent. The mercaptoacetate is used in amounts from about 1 part to 3 parts per 100 parts of vinyl resin, and the secondary activator is used in amounts from about .5 part to about 1.5 parts per 100 parts of resin. The ratio of primary to secondary activators may range from about 1 to 1.5 to 6 to 1.

Thermoplastic resins most suitable in producing the profiles above described are those made from vinyl chloride and generally referred to as PVC. Although interpolymers of vinyl chloride may be used, the most desirable results are produced when a homopolymer of vinyl chloride having an inherent viscosity of between about .66 and about 1.12 is used in combination with the activator system of this invention.

The rigidity of the profile produced from the dry blend thermoplastic resin composition of this invention results from compounding the resin in the manner described in the examples above where components having an appreciable plasticizing effect on the resin are not present. The components of the activator system as well as the processing aid and the internal and external lubricants together with the impact modifier has little or no appreciable effect on the rigidity of the extruded resin. By a rigid profile is meant a profile made from a vinyl resin which has not been substantially modified with a component having a plasticizing or flexibilizing effect on the resin.

Conventional processing aids as well as conventional internal and external lubricants together with impact modifiers may be used. Any of the well-known polymers made from acrylonitrile, butadiene and styrene and generally referred to as ABS resins, made in a conventional manner as, for example, shown in U.S. Pat. No. 2,802,809 may be used when more resistance to fracture by impact is desirable. More specifically the modifier is a graft resin in which from 20 to 30 parts of acrylonitrile and from 80 to 70 parts of styrene are polymerized in the presence of polybutadiene. The ratio of polybutadiene to acrylonitrile/styrene resin grafter thereon ranges from 15/85 to 45/55. The impact modifier is further described in British Pat. No. 1,090,670 as being an acrylonitrile/butadiene/styrene resin having a tensile strength of from about 2,400 pounds per square inch at 73° F. and a specific gravity of 0.99 to a tensile strength of 5,500 pounds per square inch and a specific gravity of about 1.04.

Conventional processing aids may also be used in the amounts necessary to smooth and homogenize the blowable composition melt and facilitate its passage through a conventional extruder.

After the components in the noted formulation have been mixed in the manner described, this dry blend composition is then processed in a conventional extruder which has been fitted with the desired die and specifically the tee die used in the example, and which extruder has been heated to the temperature conditions indicated above for each of the four zones and for the die. The extruder is then operated at a screw speed under a motor load as indicated at the rate indicated. These temperatures and residence time are commercially acceptable and may be used because the composition being extruded has been balanced, particularly with respect to the activator system, to permit the use of these conditions. Unless the activator system as shown here is used in the formulations described, there is danger of excessive decomposition of the exothermic chemical blowing agents resulting in loss of control and unsatisfactory cell structure, required profile dimensions and smoothness of skin which is dependent upon the internal microcellular structure of the profile.

The chemical balance present in the blowable composition of this invention results in the proper fluxing of the vinyl resin to produce a molten mixture into which the gaseous nitrogen is released at the proper time by the blowing agent, which then becomes dissolved in the molten plastic under the operating pressures of the extruder. As the plastic melt passes through the die into the atmosphere the pressure built up within the extruder is relieved causing the dissolved gaseous nitrogen to emerge from solution and form the microcellular gas cells uniformly throughout the extruded mass other than within the skin layer. The skin layer forms because of the laminar flow across the relatively cool metal surface of the die. Laminar flow is described as being a series of concentric layers of molten plastic, the most interior layer moving somewhat faster than the outer layers. The molten thermoplastic mixture that touches the cooler metal surface of the die becomes must more viscous than the next layer thereof and as a result a smearing action drives the gaseous nitrogen into the interior layers of the profile to thereby form a relatively smooth and integral skin. The successful performance as just described depends upon the formulation of the expandable composition and particularly upon the combination of the activator system described herein in combination with the chemical blowing agent and the particular resin being blown.

The formation of a smooth integral skin is dependent, among other things, upon the amount of chemical blowing agent used. If a certain porosity is desired beyond an amount which requires a greater amount of blowing agent, it is obvious that although the increased porosity is achieved, the skin will have been disrupted and its smoothness destroyed. The present invention permits a maximum expansion of the extruded profile or a minimum density foam without destroying the requirements of a smooth and integral skin. This is achieved in the present invention by the use of the activator system which functions to extract a maximum amount of gas from the blowing agent at the preferred thermal conditions for extrusion thus producing a blow which would otherwise by possible only by increasing the amount of the blowing agent. Thus the present activator system of this invention permits a fine adjustment with regard to the amount of gas released from the chemical blowing agent and thus preserving the desirable properties of the smooth and integral skin required for the profile. The activator system of this invention functions to control the temperature and rate at which the gaseous nitrogen is released from the chemical blowing agent, which temperature and rate is adjusted in such a way that the resin composition becomes a plastic melt at a temperature to permit its expansion while at the same time restricting the size of the cells to the microcellular characteristics required in the profile to impart thereto the woodlike whittlability and nailability of the profile while at the same time not overloading the profile with gaseous nitrogen to the point where the skin is disrupted into an uneven and non-integral skin.

The woodlike characteristics of the profile of this invention is such that the profile may be used wherever wood is used for trim and other decorative purposes in house construction. Ordinarily the physical properties of a plastic deteriorate when part of the volume is replaced with a gas as occurs with a foam. The microcellular structure of the profiles of this invention are such as to preserve much of the integrity and dimensional stability of the blown plastic. The woodlike properties of the profile of this invention will sustain impact like wood and if severely crushed will not recover, and like wood the individual cells of the blown profile are weak enough to yield to a piercing or cutting edge and compress so as not to transmit the stress to adjoining cells and initiate cracking. It is this property which permits the profile to be nailed and whittled.

The integral skin also contributes to the woodlike nature of the extruded profile and the smooth nature of the skin provides a good base for lacquering, printing or coating the profile thereby giving the profile the finished appearance of any hard wood desired and also producing a case-hardening and toughening effect in the skin.

While certain representative embodiments and details have been shown for the purpose of illustrating the invention, it will be apparent to those skilled in this art that various changes and modifications may be made therein without departing from the spirit or scope of the invention.

What is claimed is:

1. A composition extrudable into an impact resistant, cellular closed cell whittlable and nailable woodlike structure having an integral skin comprising a substantially unplasticized vinyl chloride resin having an inherent viscosity from about .66 to about 1.12, from 0 to 5.0 parts of a lubricant for aiding in the extrusion of the resin, from about .1 to about 3.5 parts of a chemical blowing agent and an activator system for the chemical blowing agent comprising as a primary chemical blowing agent activator, from about 1.0 to about 3.0 parts of an organo tin thioglycolate ester, and as a secondary activator, from about .5 to about 1.5 parts of a barium salt of a saturated fatty acid having from 14 to 18 carbon atoms, all parts being by weight per 100 parts by weight of resin.

2. The composition of claim 1 wherein the secondary activator is selected from at least one of the group consisting of barium palmitate, barium stearate, and the barium salts of hydrogenated unsaturated fatty acids having a carbon content between $C_{14}$ and $C_{18}$.

3. The composition of claim 1 wherein the primary activator is di n-butyl tin bis (isooctylmercaptoacetate).

4. The composition of claim 2 wherein the glycolate is a mixture of a major amount of di n-butyl tin bis (isooctylmercaptoacetate) and a minor amount of mono n-butyl tin bis (isooctylmercaptoacetate).

5. The composition of claim 1 wherein the ratio of the primary to the secondary activator is from 1:1.5 to 6:1.

6. The composition of claim 1 wherein the chemical blowing agent is azodicarbonamide.

7. The composition of claim 6 wherein the chemical blowing agent is azodicarbonamide present in an amount between about .3 to about 1.0 parts per 100 parts of resin.

8. The composition of claim 1 wherein from about 5 to about 12 parts of an impact modifier is present of the composition comprising a polymer of acrylonitrile, butadiene and styrene.

9. A method of producing a rigid impact resistant, microcellular whittlable and nailable woodlike structure having an integral skin smooth to the touch which comprises continuously extruding as a dry blend the composition of claim 1.

* * * * *